Patented June 9, 1953

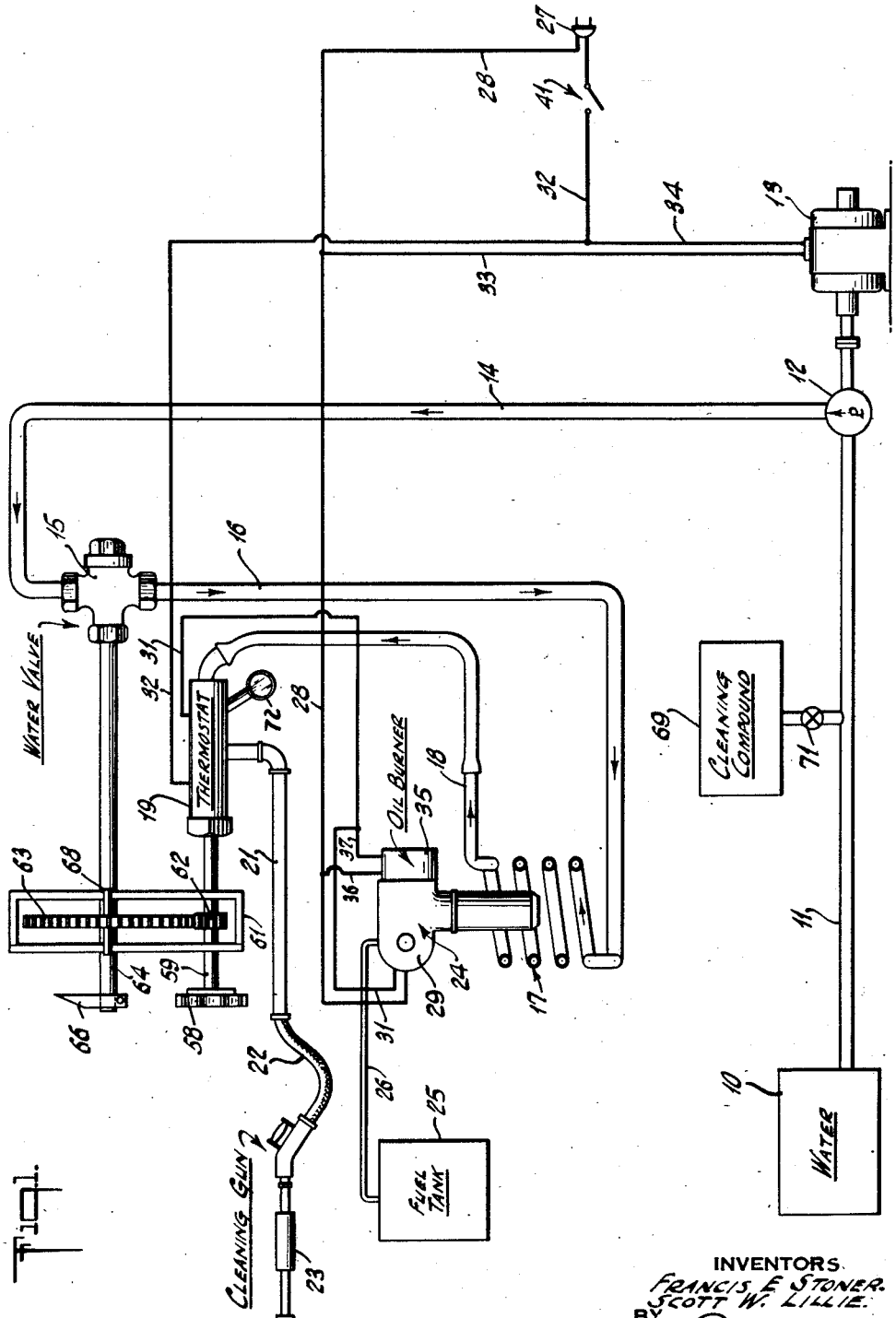

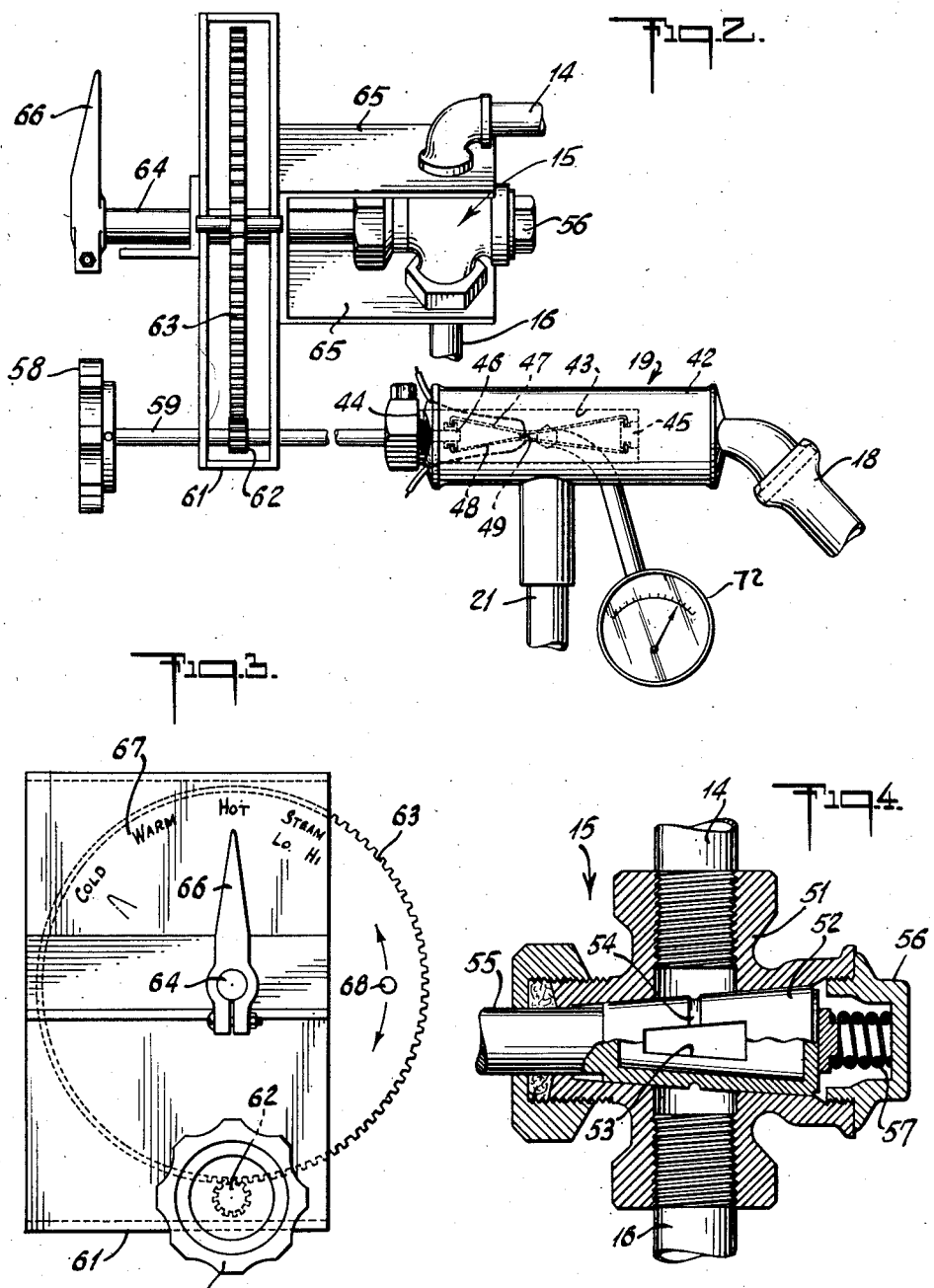

2,641,508

UNITED STATES PATENT OFFICE 2,641,508

CONTROLS FOR STEAM-WATER CLEANING APPARATUS

Francis E. Stoner and Scott W. Lillie, Dayton, Ohio; said Stoner assignor to United Aircraft Products, Inc., Dayton, Ohio, a corporation of Ohio Application February 24, 1949, Serial No. 78,074

9 Claims. (Cl. 299—84)

This invention relates to machines for obtaining a controlled discharge of water and steam for heavy duty cleaning and like purposes.

Ordinarily, such machines comprise a portable power generating unit and a hand-held spray gun connected to the power unit by a flexible fluid conducting hose line. In the power generating unit, among other elements, are a water pump, a heating coil, an oil burner for heating the coil, a valve for controlling the rate of water flow to the heating coil, and automatic means including a thermostat responsive to the temperature of the heated water for energizing and deenergizing the oil burner. Through adjustment of the water valve and the thermostat, the fluid discharge at the gun may be caused to assume the forms of whole liquid or of steam.

In accordance with the instant invention, it is proposed to provide such range of adjustments of the thermostat and valve as to enable a fluid discharge selectively in a range beginning with cold or unheated water and extending through warm water and hot water to variably saturated steam stages. To obtain such close and flexible control of the discharge from the gun, it is necessary that the action of the water valve and thermostat be accurately correlated. Heretofore, these elements have been separately operable and difficult of access, being located within the power generating unit. In accordance with a further object of the instant invention, the water valve and thermostat are placed under the control of a single control member which is located on the power generating unit exteriorly thereof, and which is operable to effect simultaneous and corresponding adjustments of the thermostat and water valve. Thus, through operation of the single control member, with which an indicating dial may conveniently be associated, a rapid and accurate change over between water and steam and intermediate stage operation is possible.

Other objects and structural details of the invention will appear from the following description when read in connection with the accompanying drawings, wherein:

Fig. 1 is a diagrammatic view of steam-water cleaning apparatus in accordance with the present invention;

Fig. 2 is a detail view, in side elevation, of the operating controls of the apparatus;

Fig. 3 is a detail view, in front elevation, of the operating control member and associated indicator dial; and Fig. 4 is a view, in longitudinal section, through the water valve.

Referring to the diagram of Fig. 1, a system including the apparatus of the instant invention may include, generally, a water source 10. Extending from the source 10 is a pipe line 11 within which is arranged a pump 12 driven by an electric motor 13. The pump 12 discharges water under pressure through a pipe 14 to a valve 15, and may incorporate a pressure responsive by-pass for the recirculation of water supplied in excess of the demand in the system. The valve 15 functions, in a manner hereinafter to be described, to vary the rate of flow of the water. Pipe 14 communicates with the inlet side of valve 15, while to the outlet side thereof is connected a pipe 16. The pipe 16 in turn conducts the water to the inlet side of a coil 17. After flowing through the coil 17, the water is conducted by way of a pipe 18 to a thermostatic unit 19 and flows out of the thermostatic unit through a pipe 21. Connected to the pipe 21 is a flexible fluid conducting hose line 22 at the outer end of which is a hand held spray gun 23.

Mounted in position to heat the coil 17 is an oil burner 24 drawing fuel from a tank 25 by way of a conduit 26. The burner 24 is electrically energizable, being arranged in an electrical circuit comprising a main or master switch and a supplemental control switch. The electrical circuit includes a plug 27 adapted to be connected to a source of electricity. From the plug 27 extends a conductor 28 which is connected directly to the motor 29 of the oil burner 24. From the motor 29, an extension 31 of conductor 28 leads to the thermostatic unit 19, while a further extension 32 returns to the plug 27. The electric motor 13 is connected in the circuit by branch leads 33 and 34 joined respectively to conductor 28 and return line 32. The oil burner 24 further includes a transformer 35 which is connected in the electrical circuit by leads 36 and 37 joined to conductor 28 and extension 31. The aforementioned main or master switch is arranged in return line 32, being indicated at 41 therein. When the switch 41 is closed, a circuit is made through the motor 13 and oil burner motor 29 and transformer 35, with the result that pump 12 operates to force water through the system to the gun 23, and burner 24 operates to heat the coil 17 and thereby the water flowing therethrough. The aforementioned supplemental control switch is comprised in the thermostatic unit 19 and functions to make and break the circuit through oil burner motor 29. It is to be noted that the electric motor 13 is in parallel relation to the burner 24 in the circuit, and so will continue in operation irrespective of the action of the supplemental switch in unit 19 so long as main switch 41 is closed.

Referring to Fig. 2, the thermostatic unit 19 comprises a cylindrical casing 42 closed at its opposite ends and connected to the aforementioned pipe lines 16 and 21 in such manner that the heated water flowing from the coil 17 to the spray gun 23 is compelled to pass through the casing 42. Disposed axially within the casing 42, and spaced from the sides thereof so as to be washed by water passing through the casing, is a commercially known and available thermoswitch device. In the illustrative embodiment of the invention, the thermoswitch selected for installation in the casing 42 is one comprising a thermally sensitive shell 43, in the outer end of which is an axially adjustable threaded stud 44. At one end of the shell 43 is secured an anchor member 45, while a similar anchor member 46 is arranged at the opposite end of the shell, having a left hand screw threaded mounting in the threaded stud 44. Connected at their opposite ends to the anchor members 45 and 46 is a pair of metal strips 47 and 48, tensioned to assume concave positions resulting in the midportions of the strips pressing upon and engaging one another. At the mid-portions of the strips 47 and 48 is a pair of electrical contacts 49, to one of which the electrical conductor extension 31 is connected, and to the other of which the return lead 32 is connected. As is conventional in devices of this class, the construction and arrangement is such that when the metal strips 47 and 48 are allowed to assume their normal condition of flexure the contacts 49 are closed and a flow of current therethrough between the electrical leads 31 and 32 is permitted. If, however, the metal strips 47 and 48 are stretched, the contacts 49 are separated and current flow through the thermoswitch is interrupted. In the system presently under consideration, opening of the contacts 49 causes interruption of current flow through the oil burner 24 with the result that heating of coil 17 is discontinued.

Stretching of the metal strips 47 and 48 to open the electrical circuit is accomplished by effecting relative axial movement between the anchor members 45 and 46. The aforementioned stud 44 has a threaded mounting in one end of casing 42 so that axial expansion and contraction of the shell 43 under the influence of temperature variations is accomplished relatively to the stud 44 and anchor member 46. Thus, as the shell 43 expands axially, the metal strips 47 and 48 are spread apart to open the contacts 49. Contraction of the shell permits the strips 47 and 48 to return to a concave shape and to close the contacts 49. Further, oscillation of the stud 44 effects an axial extension and retraction of the anchor member 46 relatively to the shell 43 so that the initial spacing between the anchor members 45 and 46 may be varied. The result of such adjustment of the stud 44 is to raise and lower the temperature value at which the contacts 49 are opened. That is, if stud 44 is turned in a counter-clockwise direction and anchor member 46 is caused to approach more closely to the anchor member 45, a greater expansion of the shell 43 is necessary to break the contacts 49 and a correspondingly higher temperature value must be attained within the cylinder 42 before the electrical circuit is interrupted to discontinue operation of the burner 24. Similarly, clockwise turning of stud 44 effects retractive adjustment of the anchor member 46 to increase the distance by which it is separated at an earlier point in the expansion travel of the shell 43, with the result that operation of the burner 24 is discontinued at a lower temperature value.

The water valve 15 is shown in detail in Fig. 4. As there illustrated, it comprises a body 51 into opposite or inlet and outlet sides of which extend the pipe lines 14 and 16. Disposed within the body 51 of the valve, transversely of the inlet and outlet sides thereof, is a tapered plug valve 52. The valve 52 has a substantially rectangular opening 53 therethrough and is surrounded by a peripheral groove 54, the opening 53 and groove 54 lying in the same vertical plane as the inlet and outlet sides of the valve. The construction and arrangement is such that the plug valve 52 may be rotated to place the rectangular opening 53 therein into and out of alignment with the inlet and outlet connections so as alternatively to permit and prevent a large volume flow from the pipe line 14 to the pipe line 16. Further, irrespective of the position of the rectangular opening 53, flow between the inlet and outlet connections is permitted around the plug valve by way of peripheral groove 54. The groove 54 represents a restricted path of flow, however, and the rate of flow through the valve 15 is materially reduced when the plug valve 52 is set to place opening 53 therein out of registry with the inlet and outlet connections of the valve. The tapered plug valve 52 is received in a complementary bore in the body 51 and has a projecting stem 55 extending from one end of the bore outside the body 51. The opposite end of the bore is closed by a cap 56 housing a spring 57 acting to urge the plug valve 52 into a seated position in its retaining bore.

Adjustment of the water valve 15 and thermostatic unit 19 is, in accordance with the instant invention, placed under the control of a single operating member. Referring to Figs. 2 and 3, this operating member is a knob 58 which, in the structural embodiment of the invention, is arranged at the front of the power generating unit, exteriorly thereof. The knob 58 is fastened to a shaft 59 which extends into the power generating unit and through a gear case 61 therein. Projecting through and beyond the gear case 61 the shaft 59 is received by and keyed, or otherwise connected, to the stud 44 comprised in thermostat 19. Accordingly, rotation of the knob 58 results in rotation of the stud 44 and a corresponding adjustment in the spacing between the anchor members 45 and 46 with the effect previously described. Within the gear case 61 the shaft 59 has secured thereto a small gear 62 meshing with a larger gear 63. The gear 63 is secured to a shaft 64 which extends transversely through the case 61 and which is secured to or is an integral part of the stem 55 of plug valve 52. Accordingly, rotary motion of the knob 58 is effective not only to adjust thermostat 19, but also to rotate plug valve 52 to admit a greater or lesser quantity of water through valve 15. As shown in Fig. 2, in the construction of the apparatus the valve 15 may be supported by brackets 65 integral with the case 61 to insure a rigid mounting of the valve relatively to the case 61 and shaft 64.

Outside the case 61, the shaft 64 has mounted thereon an indicator pointer 66 arranged to traverse a dial 67, which may be inscribed upon the case 61 or upon the frame of the power generating unit, if the case 61 is inside the frame. The dial 67 is arranged in terms of water temperature and pressure, and may be, for simplicity, limited to the several designations "Cold, Warm, Hot, and Steam." A limit of movement in opposite directions for the control mechanism is defined by a stud 68 carried by the gear 63 adjacent the periphery thereof. The stud 68 is engageable with the edge of gear case 61 to limit the motion of the knob 58 in clockwise and counterclockwise directions of rotation. In its rightward or clockwise limit of movement, the knob 58 is effective to separate the contacts 49 in thermostat 19, or to condition the thermostat for separation of the contacts at a minimum temperature value, and further is effective to adjust the plug valve 52 for full volume flow through the water control valve 15. In this position of the parts, the indicator 66 points to the designation "Cold," and it will be apparent that adjustment of the knob to this position will result in a discharge from the spray gun 23 of a maximum quantity of cold or unheated water.

In the operation of the machine, therefore, closing of the switch 41 will serve to energize motor 13 to start pump 12 flowing water through the system, and, if the contacts 49 in thermostatic unit 19 are closed, will serve to energize the oil burner 24 to initiate heating of the water flowing through coil 17. As the heated water passes from coil 17 into casing 42 of the thermostatic unit, shell 43 therein responds to the rising water temperature by expanding. In the course of such expansion, the metal strips 47 and 48 are stretched to open contacts 49 and interrupt current flow through the oil burner 24, this operation taking place at a temperature value predetermined by the setting of control knob 58. Although the oil burner 24 is shut off, the water pump 12 continues to operate and water continues to flow through the system, including coil 17 and thermostatic casing 42. As the temperature within casing 42 decreases, the shell 43 contracts, and, at a predetermined temperature value, the contacts 49 are permitted to close and a circuit again is made through the oil burner 24, energizing the burner for resumption of heating. So long as the switch 41 remains closed, the apparatus will continue to function in this manner with the oil burner being intermittently energized and deenergized to maintain a water temperature and character of fluid discharge as determined by the initial adjustment of control knob 58. As previously seen, if knob 58 is set for the production of cold or unheated water, energizing of the burner 24 will take place infrequently, if at all. If the control knob is moved in a counterclockwise direction, however, the distance separating anchor members 45 and 46 in the thermostatic unit is reduced and a higher temperature value in the casing 42 is required to effect a separation of the contacts 49. The oil burner 24, accordingly, will be energized with an increasing frequency and the temperature of the water discharged by the spray gun correspondingly will rise. As the indicator pointer 66 reaches that range on the dial 67 representing steam operation, the distance separating the anchor members 45 and 46 in thermostatic unit 19 approaches a minimum and the oil burner 24 may operate almost continuously. Moreover, such extent of rotation of the control knob 58 is effective to adjust the plug valve 52 to a position placing full flow opening 53 therein out of communication with the inlet pipe 14 and outlet pipe 16. Only such flow is permitted through the valve 15, therefore, as may take place around plug valve 52 through groove 54. This restricted flow of water to the coil 17, coupled with the more intense heating of the coil by the oil burner, results in the supplying of a highly heated fluid to the spray gun 23, and, as the fluid escapes from the gun, a portion thereof flashes into steam. In this connection, it will be understood that the cleaning gun 22 includes a nozzle, which may be replaceable, for greater and lesser restriction to flow. The degree of saturation of the steam is likewise dependent upon the position of adjustment of knob 58. In its extreme lefthand or counterclockwise limit of motion, knob 58 so adjusts the thermostatic unit 19 as to produce at the gun a substantially high pressure steam.

The system may include other elements for modified or more efficient operation. It may, for example, include a source of cleaning compound, as indicated at 69 in Fig. 1. The cleaning compound preferably is admitted to pipeline 11, in advance of pump 12, and in metered quantities under control of a valve 71. Also, as shown in Fig. 2, a guage 72 may be connected to casing 42, or elsewhere in the system, to exhibit the prevailing water pressure or temperature, or both.

What is claimed is:

1. In a machine for obtaining a controlled discharge of water and steam for cleaning and like purposes; a water source; a pump for withdrawing water from said source; a coil supplied with water under pressure by said pump and having an inlet and an outlet side; a spray gun communicating with the outlet side of said coil; a pipeline interconnecting said source, said pump, said coil, and said gun; an adjustable volume flow control valve arranged in said pipeline between said pump and the inlet side of said coil; an adjustable thermostat in said pipeline between the outlet side of said coil and said gun; an oil burner for heating said coil; an electrical circuit for initiating operation of said oil burner and of said pump; a switch in said circuit operable by said thermostat; and actuating means having a common connection thereto for effecting simultaneous and corresponding adjustments of said thermostat and of said water valve.

2. A machine according to claim 1, characterized in that said last named means comprises a manually rotatable control knob and interacting connections between said knob and said thermostat and said water valve operable in response to rotation of said knob in one direction to adjust said valve to admit a lesser volume of water to said coil and to adjust said thermostat to open said switch at a higher water temperature, said knob and said connections functioning in response to rotation of said knob in the opposite direction to adjust said valve to increase the flow of water and to lower the temperature value at which said thermostat opens said switch.

3. In a machine for obtaining a controlled discharge of water and steam for cleaning and like purposes; a water conduit arranged as a coil and having an inlet side and an outlet side; means for supplying water under pressure to the inlet side of said coil; a spray gun connected to the outlet side of said coil; means for heating said coil; an electrical circuit for energizing said heating means; a main switch for opening and closing said circuit; a supplemental switch in said circuit; an adjustable thermostat subjected to the flow out of the discharge side of said coil for opening and closing said switch; a valve arranged in advance of the inlet side of said coil to adjust the rate of water flow to said coil; and means for making simultaneous and corresponding adjustments of said thermostat and said valve to increase the rate of water flow to said coil as the temperature value at which said supplemental switch is opened is decreased and to decrease the rate of flow as such temperature value is increased.

4. In a machine for obtaining a controlled discharge of water and steam for cleaning and like purposes; a spray gun; means for supplying water under pressure to said spray gun; a valve adjustable to increase and reduce the rate of water flow to said gun; a selectively energizable heater for heating the water flowing to said gun; automatic means including an adjustable thermostat responsive to the temperature of the water flowing to said gun for energizing and deenergizing said heater; separate actuating means for adjusting said valve and said thermostat; and a single control member having a common connection thereto for effecting simultaneous and corresponding operation of said separate actuating means.

5. In a machine for obtaining a controlled discharge of water and steam for cleaning and like purposes; a spray gun; means for supplying water under pressure to said spray gun; a valve adjustable to a steam control position materially reducing the rate of water flow to said gun; a selectively energizable heater for heating the water admitted to said gun by said valve; automatic means including a thermostat responsive to the temperature of the heated water for energizing and deenergizing said heater, said thermostat being adjustable to a steam control position materially raising the temperature value at which said heater is deenergized; and a common control member having a common connection thereto for adjusting said valve and said thermostat simultaneously and in correspondence with one another to and from said steam control positions.

6. In a machine for obtaining a controlled discharge of water and steam for cleaning and like purposes; a spray gun; means for supplying water under pressure to said spray gun; a valve adjustable to vary the rate of water flow to said gun; a selectively energizable heater for heating the water admitted to said gun by said valve; automatic manipulative means having a common connection thereto including an adjustable thermostat responsive to the temperature of the heated water for energizing and deenergizing said heater; and means for effecting a simultaneous and corresponding adjustment of said valve and of said thermostat to produce a discharge at said gun ranging from cold water through warm and hot water to steam of variable saturation.

7. In a machine for obtaining a controlled discharge of water and steam for cleaning and like purposes; a water conduit arranged as a coil and having an inlet and an outlet side; a pump for supplying water under pressure to the inlet side of said coil; an electrically energizable motor for driving said pump; a spray gun connected to the outlet side of said coil; electrically energizable means for heating said coil; an electrical circuit in which said heating means and said pump motor are disposed in parallel relation; a master switch for opening and closing the circuit through said pump motor and said heating means; a supplemental switch for opening and closing the circuit through said heating means independently of said pump motor; an adjustable thermostat subjected to the flow out of the discharge side of said coil for opening and closing said supplemental switch; a valve arranged in advance of the inlet side of said coil to adjust the rate of water flow to said coil; and means for making simultaneous and corresponding adjustments of said thermostat and said valve to increase the rate of water flow to said coil as the temperature value at which said supplemental switch is opened is decreased and to decrease the rate of flow as such temperature value is increased.

8. In a machine for producing a cleaning spray ranging from cold water through warm, hot, and steam stages; means defining a heating zone; means defining a path of flow for water under pressure through said heating zone to the atmosphere; adjustable means for varying the rate of water flow to said heating zone; a thermostat in said path of flow and means having a common connection to said adjustable means and said thermostat for raising the temperature of said heating zone in response to and as said adjustable means is moved to decrease the rate of flow to said zone, and to decrease the temperature of said heating zone as said adjustable means is moved to increase the rate of flow to said zone.

9. In a machine for producing a cleaning spray ranging from cold water through warm, hot, and steam stages; means defining a heating zone; means defining a path of flow for water under pressure through said heating zone to the atmosphere; adjustable means for varying the rate of water flow to said heating zone; a thermostat in said path of flow and means having a common connection to said adjustable means and said thermostat for varying the temperature of said heating zone as said adjustable means is moved and in an inverse relation thereto.

FRANCIS E. STONER.
SCOTT W. LILLIE.

References Cited in the file of this patent
UNITED STATES PATENTS

| Number | Name | Date |
| --- | --- | --- |
| 1,925,463 | Ofeldt | Sept. 5, 1933 |
| 2,128,263 | Ofeldt | Aug. 30, 1938 |
| 2,289,674 | Ofeldt | July 14, 1942 |
| 2,295,228 | Malsbary et al. | Sept. 8, 1942 |
| 2,345,614 | Malsbary et al. | Apr. 4, 1944 |